United States Patent [19]
Floyd

[11] 3,893,338
[45] July 8, 1975

[54] SELF-ORIENTING POTENTIOMETER
[75] Inventor: Grady O. Floyd, Saugus, Calif.
[73] Assignee: The United States of America as represented by the Secretary of the Army, Washington, D.C.
[22] Filed: Aug. 26, 1974
[21] Appl. No.: 500,836

[52] U.S. Cl. ............................................. 73/188
[51] Int. Cl. ...................... G01w 1/00; G01p 13/02
[58] Field of Search ............................ 73/188, 189

[56] References Cited
UNITED STATES PATENTS
| | | | |
|---|---|---|---|
| 2,836,064 | 5/1958 | York | 73/188 |
| 3,387,491 | 6/1968 | Adams | 73/189 |

Primary Examiner—James J. Gill
Assistant Examiner—Anthony V. Ciarlante
Attorney, Agent, or Firm—Nathan Edelberg; Robert P. Gibson; Jeremiah G. Murray

[57] ABSTRACT

A potentiometer which is capable of self-orientation with respect to a predetermined reference. The potentiometer has an endless loop of resistive material to which is attached a plurality of fixed conductive taps. An arm having a pair of conductors which terminate in a pair of contacts floats freely above the resistor and aligns itself with the predetermined reference. A clamping disc moves the arm into contact with the resistive loop while a voltage is applied to the conductors. The voltage causes a small portion of the resistive loop to burn and disintegrate thereby creating a potentiometer which is oriented with respect to the predetermined reference.

10 Claims, 4 Drawing Figures

SELF-ORIENTING POTENTIOMETER

BACKGROUND OF THE INVENTION

The present invention relates to a self-orienting potentiometer and more particularly to an adjustable three-terminal voltage divider which can be automatically oriented with respect to a given reference.

The potentiometer has found widespread use in many fields of electronic instrumentation as a means for indicating or measuring the relative angular displacement of a shaft with respect to a given reference. Such devices are sometimes implemented with adjustable three-terminal voltage dividers of the resistive type.

One of the most critical problems confronting designers of potentiometers of this type has been the development of simple, inexpensive, yet highly accurate, methods or apparatus for initially orienting the potentiometer with respect to a predetermined reference. The problem is compounded when the orientation must be performed without human intervention.

For example, in the field of weather observing, instruments for measuring wind direction are sometimes deployed in remote locations not easily accessible by man. Such automatic weather vanes may, for example, be dropped from aircraft to remote locations. Telemetering devices in the automatic weather vanes transmit signals which are a function of the wind direction. The weather vane may include a voltage controlled oscillator circuit the frequency of which is controlled by the output of a potentiometer. Therefore, the frequency output of the oscillator is a function of the relative angular displacement between the wind and the potentiometer terminals. Because the ultimate information usually required is the wind direction relative to magnetic north or some other geographical reference, a means must be provided for remotely determining the special orientation of the potentiometer. Actually, the telemetered information is even more useful, if the potentiometer itself is initially oriented with respect to the given reference such as magnetic north.

SUMMARY OF THE INVENTION

The general purpose of this invention is to provide a self-orienting potentiometer which includes apparatus for automatically and permanently orienting the potentiometer relative to a given reference such as magnetic north on a predetermined command. To attain this, the present invention contemplates the use of a means which automatically detects the given reference and aligns a pair of terminals therewith. On a predetermined command, a voltage is applied across the terminals to automatically establish the permanent orientation of the potentiometer. Other objects and features of the invention will become apparent to those skilled in the art as the disclosure is made in the following description.

DESCRIPTION OF THE PREFERRED EMBODIMENT

Figure 1:
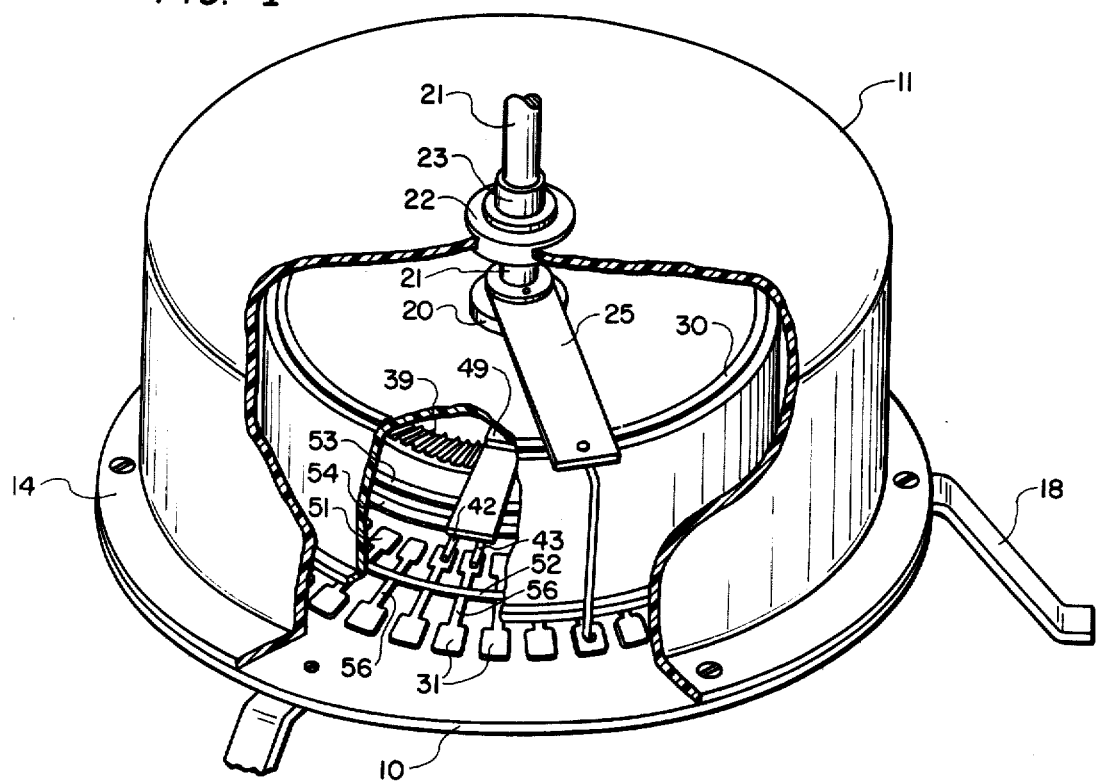
FIG. 1 is an isometric drawing, partially cut-away, of the preferred embodiment of the present invention.

Referring now to the drawing, wherein like reference characters designate corresponding parts throughout the several views, there is shown a potentiometer which includes a flat rigid plate 10 and three flanged covers 11, 12 and 13 mounted thereon to define three chambers 15, 16 and 17. Plate 10 and covers 11, 12 and 13 may be conveniently formed from a nonconductive material such as plastic, or the like. A peripheral flange 14 on cover 11 fixes the cover 11 to plate 10 with the bolts 32. A plurality of legs 18 on which the potentiometer stands are also fixed to the plate 10 by bolts 32.

Located in chamber 15 are the potentiometer arm 25 carrying wipers 26 and 27, a plurality of equally spaced potentiometer taps 31, and a conductive slip ring contact 30. Arm 25 includes a collar 28 carrying a set screw or the like (not shown) for fixing the arm 25 to shaft 21. The shaft 21 is fixed by a set screw or the like (not shown) to the inner bushing 23 of a bearing 22 fixed to the cover 11. Bearings 20 and 22 may be fixed by a suitable cement or other standard means to the covers 12 and 11 respectively. Bearings 20 and 22 permit the free rotation of shaft 21. However, the fixing of shaft 21 to the bushing 23 prevents the longitudinal movement of shaft 21 and maintains the end of shaft 21 properly seated in bearing 20.

Wipers 26 and 27, formed from a common piece of resilient conductive material and rivoted to the arm 25, make good electrical sliding contact with the taps 31 and contact 30, respectively. Contact 30 is a continuous ring of electrically conductive material deposited on the outer periphery of the upper surface of cover 12.

Chamber 16 is hermetically sealed and is filled with an electrically nonconductive fluid. Also located in chamber 16 are a post 35, arm 36, sawtooth fence 39, conductive taps 51, potentiometer resistor 52, and a pair of slip ring contacts 53 and 54.

The arm 36 has a center opening 37 and is loosely fit on post 35. Arm 36 together with those elements mounted thereon is of a sufficient size and weight so as to float freely in the fluid in chamber 16.

Figure 2:
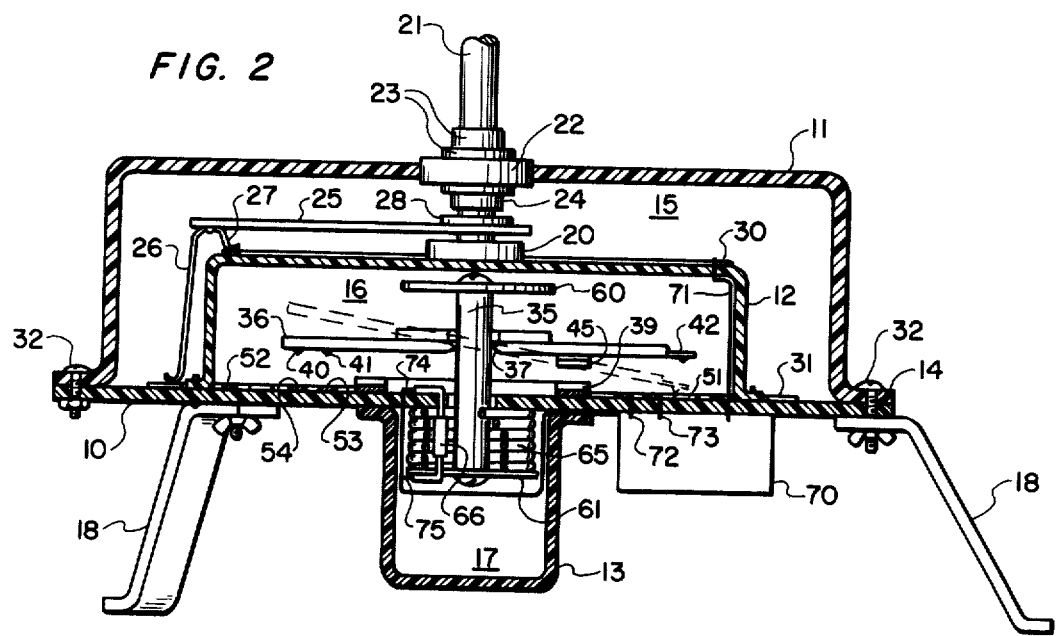
FIG. 2 is a cross section drawing of the preferred embodiment.
Figure 3:
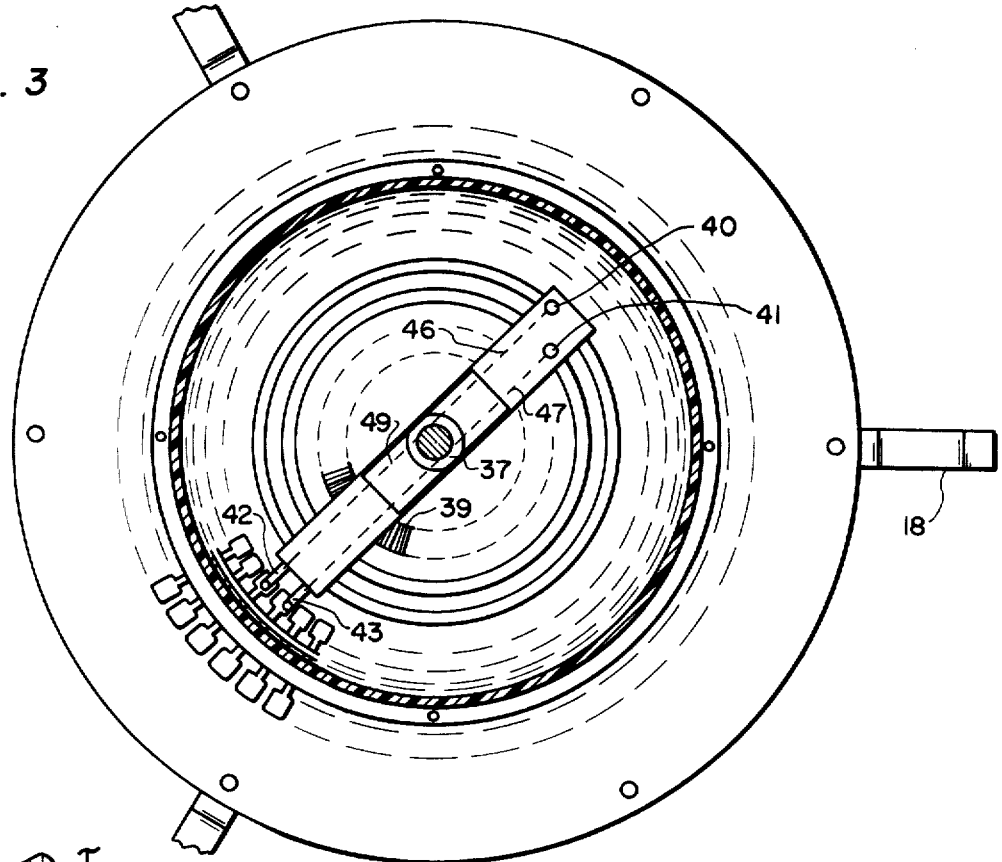
FIG. 3 is a partial plan view of the self-orienting potentiometer as shown in FIG. 1.

Arm 36 may be formed from a flat rectangular piece of nonconductive material on which is mounted four electrical contacts 40, 41, 42, and 43 and a centering tooth 45. Contacts 40 and 42 and contacts 41 and 43 are joined electrically by conductors 46 and 47 respectively (see FIG. 3) both of which may be embedded in arm 36. A magnet 49 is fixed to the upper surface of arm 36 and is polarized along the length of the arm 36. As a result of magnet 49, the arm 36, like a magnetic compass needle, will align itself in the direction of magnetic north when floating in the fluid in chamber 16. FIG. 2 shows a phantom drawing of arm 36 in addition to the solid line drawing to illustrate that the arm 36 should be free to assume a floating horizontal position even when the potentiometer structure may be slightly tilted.

The taps 31 and 51 are connected by conductive strips 56 which are deposited on plate 10 and pass beneath the edge of cover 12. The resistor 52 is then deposited in a continuous ring crossing all of the conductive strips 56. Contacts 53 and 54 are also formed from a deposition of electrically conductive material onto plate 10 in concentric rings just below contacts 40 and 41. The sawtooth fence 39 consists of a plurality of teeth which are formed to mate with centering tooth 45 on arm 36. The sawtooth fence 39 is mounted on the plate 10 such that when the arm 36 is fixedly positioned, as explained below, the centering tooth 45 is mated with the sawtooth fence 39 so as to cause the contacts 42 and 43 to make separate conductive contact with two of the taps 51.

Fixed to opposite ends of post 35 are caps 60 and 61. Post 35 passes through an opening in plate 10 and extends into chamber 17. Also located in chamber 17 is a spring 65 and an electrical fuse 66. Fuse 66 may be a simple resistor having conductive leads cemented or otherwise fixed to plate 10 and cap 61. Spring 65 is held in a compressed state between cap 61 and plate 10 by fuse 66. The chamber 16 may be made liquid tight fixing the cover 12 to plate 10 with a sealing cement. The other openings in plate 10 which communicate with chamber 16 are also sealed in a standard fashion.

An electrical package 70 containing the necessary electrical elements described below is mounted on the underside of plate 10. Conductors 71, 72 and 73 extend from the package 70 to contacts 30, 53 and 54 respectively. Conductors 74 and 75 extend from package 70 to the two conductive leads on fuse 66.

Figure 4:
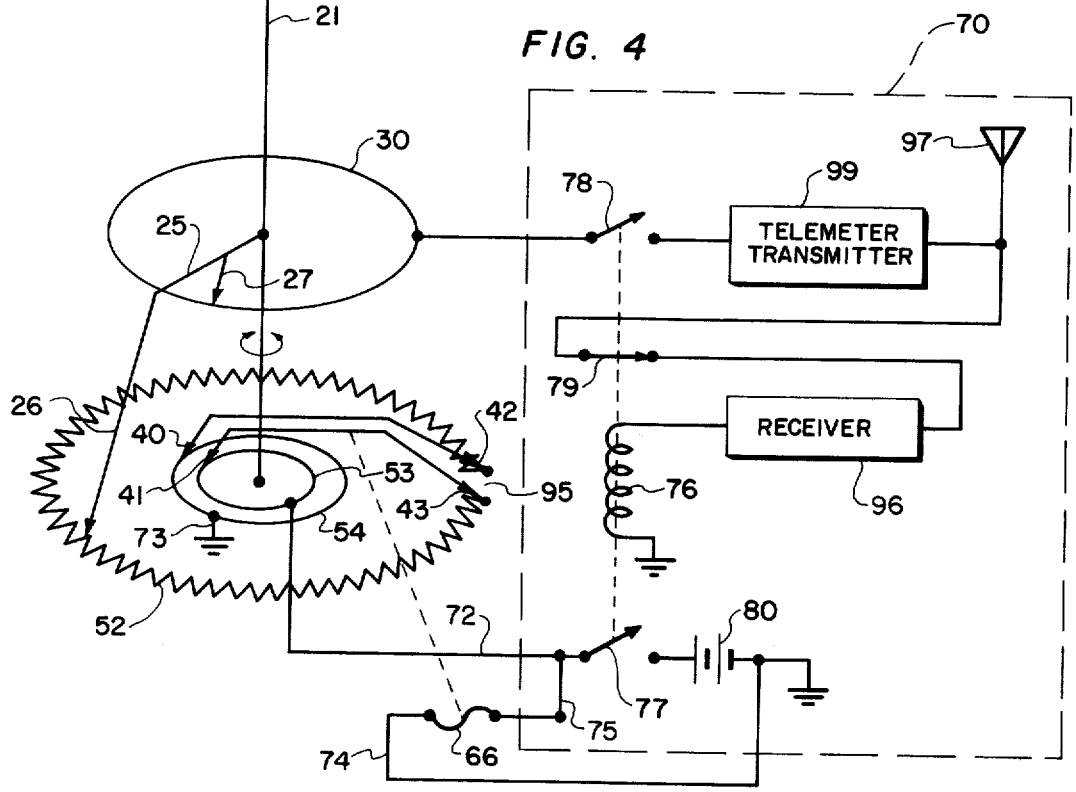
FIG. 4 is a schematic diagram illustrating the operation of the present invention.

FIG. 4, which shows a schematic of the circuit contained in package 70, will be described concurrently with the following description of the operation of the potentiometer. Basically, it is the function of the potentiometer to provide a signal which is a function of the angular position of shaft 21. For purposes of the following description, let it be assumed that the potentiometer is used as an automatic weather vane and that the upper end of shaft 21 (not shown) has a wind sock 98 or the like mounted thereon, such that the longitudinal axis of the wind sock is parallel to the length of the potentiometer arm 25. Further, it will be assumed that the automatic weather vane has been deployed by some standard mechanism not the subject of the present invention to assume the relatively stable, level position shown in FIG. 2.

After a short period of time, the arm 36 will come to rest and align itself with the earth's magnetic field such that contacts 42 and 43 point at magnetic north. At this point, a signal is transmitted from a remote transmitter to the receiver 96. In response, the receiver 96 produces an output signal to energize coil 76 such that normally open relays 77 and 78 are permanently closed and normally closed relay 79 is permanently opened. Because of this operation, the voltage of battery 80 is applied across fuse 66 and to the contact 53 via relay 77 and leads 72 and 75.

The voltage of battery 80 is sufficient to destroy fuse 66. When fuse 66 is melted the spring 65 is released causing the post 35 and cap 60 to move down thereby clamping the arm 36 by forcing the tooth 45 to mesh with the fence 39. The dimensions of the teeth on fence 39 and the location of centering tooth 45 are such to insure that the contacts 42 and 43 are centered on two adjacent taps 51, which were just below the contacts 42 and 43. The contacts 40 and 41 are also forced into electrical engagement with contacts 53 and 54 respectively.

At this point, the full voltage of battery 80 appears across that portion of resistor 52 lying between the adjacent taps 51 in contact with contacts 42 and 43. The melting point and resistance of this small portion of resistor 52 is such that the voltage of battery 80 will burn or destroy a gap 95 in the resistor 52. The full voltage of battery 80 will now appear across the remainder of the resistor 52. As a result, the contacts 42 and 43 will in effect form the end terminals of the potentiometer with the voltage of battery 80 being the reference DC voltage. Also, the gap 95 will point as near as possible in the direction of magnetic north.

The location of the wipers 26 and 27 depends on the orientation of the wind sock 98 which in turn is determined by the direction of the wind. Therefore, the input voltage to the telemeter transmitter 99 will be some fraction of the voltage of battery 80 depending on the location of the wiper 26, on the resistor 52. Finally this input voltage is converted to a standard signal by telemeter transmitter 99 and is periodically transmitted via antenna 97.

It should be understood that the foregoing disclosure relates to only a preferred embodiment of the invention and that numerous modifications or alterations may be made therein without departing from the spirit and scope of the invention as set forth in the appended claims.

What is claimed is:

1. A potentiometer capable of self-orientation with respect to a predetermined reference comprising:

a plate having an upper surface and a lower surface;

an endless loop of resistive material mounted on said upper surface of said plate;

a first arm including two contacts mounted at one end thereon, said first arm being rotatably mounted on said plate;

means, mounted on said first arm, for aligning said first arm with a predetermined reference;

means mounted on said plate for fixedly positioning said two contacts into conductive contact with said resistive loop;

means connected to each of said contacts for applying a potential across said two contacts, said potential being of sufficient value to remove the smaller portion of said resistive loop conductively connected between said two contacts; and a second arm including a third contact at one end thereon, said second arm being rotatably mounted on said plate so that said single contact is in conductive contact with said resistive loop throughout the rotation of said second arm.

2. A potentiometer according to claim 1 wherein said alignment means comprises a magnet attached to said first arm.

3. A potentiometer according to claim 1 further comprising: means connected to said potential applying means for receiving a signal from a remote transmitter and then for activating said potential applying means.

4. A potentiometer according to claim 1 further comprising:

means for converting an input voltage to a standard signal and for transmitting said signal, said converting means having an input connected to said third contact of said second arm and connected to one of said two contacts of said first arm.

5. A potentiometer according to claim 1 and further comprising:

a plurality of spatially related conductive taps attached to said resistive loop, said conductive taps providing discrete points of conductive contact for said two contacts of said first arm and for said single contact of said second arm.

6. A potentiometer according to claim 5 and further comprising:
a wind vane; and
means connected between said second arm and said wind vane for sliding said third contact along said conductive taps in response to the movement of said wind vane.

7. A potentiometer according to claim 5, further comprising:
at least one tooth-like projection mounted on the lower surface of said first arm;
a sawtooth fence mounted on said plate such that when said first arm is fixedly positioned said tooth-like projection is meshed with said sawtooth fence to cause said two contacts of said first arm to make separate conductive contact with at least two of said conductive taps.

8. A potentiometer according to claim 7 wherein:
said first arm further includes a centrally located aperture;
said plate further includes an aperture; and
said positioning means comprises:
a shaft on which said first arm is rotatably mounted, said shaft being engaged in said plate aperture so as to allow longitudinal movement of said shaft;
a pair of caps, each of said caps being mounted on each end of said shaft;
spring means, situated between said lower surface of said plate and said cap, for urging said cap away from said lower surface; and
means for normally compressing and, upon activation, for releasing said spring means.

9. A potentiometer according to claim 8 wherein said compressing and releasing means comprises an electrical fuse having one end attached to said plate and having the other end attached to said cap on the lower end of said shaft.

10. A potentiometer according to claim 8 further comprising:
a cover defining a chamber which houses said first arm, said sawtooth fence, the upper portion of said shaft, and said cap mounted on said shaft;
means positioned between said shaft and said plate for permitting a hermetic seal; and
an electrically nonconductive fluid substantially filling said chamber.

* * * * *